(12) United States Patent
Savard

(10) Patent No.: US 7,269,927 B2
(45) Date of Patent: Sep. 18, 2007

(54) SUSPENDED CEILING ASSEMBLY

(75) Inventor: Louis-Marie Savard, Colombier (CA)

(73) Assignee: Enterprises Boily Inc., Baie-Comeau, Quebec (CA)

( * ) Notice: Subject to any disclaimer, the term of this patent is extended or adjusted under 35 U.S.C. 154(b) by 174 days.

(21) Appl. No.: 10/976,862

(22) Filed: Nov. 1, 2004

(65) Prior Publication Data

US 2006/0090415 A1  May 4, 2006

(51) Int. Cl.
*E04B 5/00* (2006.01)
*E04B 9/00* (2006.01)

(52) U.S. Cl. .................. 52/506.06; 52/664; 52/506.07; 52/665; 52/506.08; 403/381; 248/317

(58) Field of Classification Search ............. 52/506.06, 52/664, 506.07, 506.08, 506.09, 506.1, 665; 403/233, 225, 220
See application file for complete search history.

(56) References Cited

U.S. PATENT DOCUMENTS

| | | | | |
|---|---|---|---|---|
| 4,454,700 A | * | 6/1984 | Kern .......................... 52/665 |
| 4,479,341 A | * | 10/1984 | Schuplin ...................... 52/665 |
| 4,674,254 A | * | 6/1987 | Koehler et al. .......... 52/506.06 |
| 4,722,161 A | | 2/1988 | Young |
| 4,735,030 A | * | 4/1988 | Judkins ................... 52/506.09 |
| 4,841,709 A | | 6/1989 | Peterson et al. |
| 5,261,204 A | | 11/1993 | Neff |
| 6,029,413 A | * | 2/2000 | Compas, Jr. ............. 52/506.06 |
| 6,158,186 A | * | 12/2000 | Feller ...................... 52/506.06 |

* cited by examiner

*Primary Examiner*—Carl D. Friedman
*Assistant Examiner*—Dan Kenny
(74) *Attorney, Agent, or Firm*—Ogilvy Renault LLP

(57) ABSTRACT

A support frame for a suspended ceiling assembly comprises a grid pattern having a plurality of main beams with opposing sides and an upper face and a plurality of cross beams with an upper face and opposed ends joined to an opposing side of the main beam; at least one of the upper faces of the main and cross beams having a guiding member; and at least one anchoring member mounted to the guiding member and displaceable therealong, the at least one anchoring member being adapted to mount the grid pattern to a ceiling.

13 Claims, 5 Drawing Sheets

SUSPENDED CEILING ASSEMBLY

BACKGROUND OF THE INVENTION

1. Field of the Invention

The invention relates generally to a ceiling system and, more particularly, to a suspended ceiling system.

2. Description of the Prior Art

Suspended ceilings are well known, and typically are formed with a grid of support members including longitudinally extending rails and secondary rails extending perpendicularly to the primary rails. Ceiling panels are then placed above the ceiling grid.

These ceilings are inexpensive to buy and install and they provide flexibility to install lighting outputs, ventilation means and an easy access once the installation is completed.

Conventional ceiling systems use metal strips to divide and support the ceiling panels. While these metal strips provide sufficient support for the ceiling panels, they have an unappealing appearance. Wood beam ceiling structures have already been described (See for instance U.S. Pat. Nos. 4,367,616, 4,454,700, 4,871,709, 5,261,204, and 6,029,413). However, these wood structures are complicated to install for many home remodelers.

SUMMARY OF THE INVENTION

It is an object of the present invention to provide a new suspended ceiling assembly which is highly aesthetic and easy to install.

One aspect of the invention provides a support frame in combination with a dropped ceiling formed of a plurality of individual ceiling panels, said support frame comprising: a plurality of elongated primary rails disposed substantially parallel to one another, each having an upper face adapted to be suspended to a ceiling and opposing sides having one of a male member and a female member, said upper face having at least one protruding member; and a plurality of elongated secondary rails disposed substantially parallel to one another, each one of said secondary rails including an upper face and opposing first and second ends, at least one of said opposed first and second ends having the other of one of the male member and the female member for matingly engaging the one of said opposing sides of said primary rails for supporting said secondary rails and forming a grid pattern, said upper face having at least one protruding member mounted proximate to one of said first and second ends engaging said primary rail and being in registry with said at least one of protruding member of said primary rail, said protruding members of said primary and secondary rails being connected with at least one connecting member, and wherein a housing covers an assembly of two protruding members connected by said connecting member.

One aspect of the invention provides a suspended ceiling assembly, comprising: a grid pattern having a plurality of main beams with two longitudinal sides and a plurality of cross beams having opposed ends and at least one of said opposed ends engaging a longitudinal side of said main beams for supporting said cross beams, said grid pattern having an inverted U-shaped member with two parallel legs drawn one towards the other by a resilient member, each one of said parallel legs being mounted to respective adjoining main and cross beams, wherein said resilient member is an endless elastic adapted to be placed over the two parallel legs; and a plurality of ceiling panels disposed over said grid pattern.

DESCRIPTION OF THE DRAWINGS

Further features and advantages of the present invention will become apparent from the following detailed description, taken in combination with the appended drawings, in which:

FIG. 3B is an enlarged cross-sectional view of the suspended ceiling assembly in accordance with the embodiment of FIG. 3 showing a vertical wall support;

FIG. 3C is an enlarged cross-sectional view of the suspended ceiling assembly in accordance with the embodiment of FIG. 3 showing a connection between a primary and two secondary rails;

FIG. 4B is an enlarged cross-sectional view of the suspended ceiling assembly in accordance with the embodiment of FIG. 4 showing a connection between a primary and a secondary rails.

It will be noted that throughout the appended drawings, like features are identified by like reference numerals.

DESCRIPTION OF THE PREFERRED EMBODIMENTS

Figure 1:
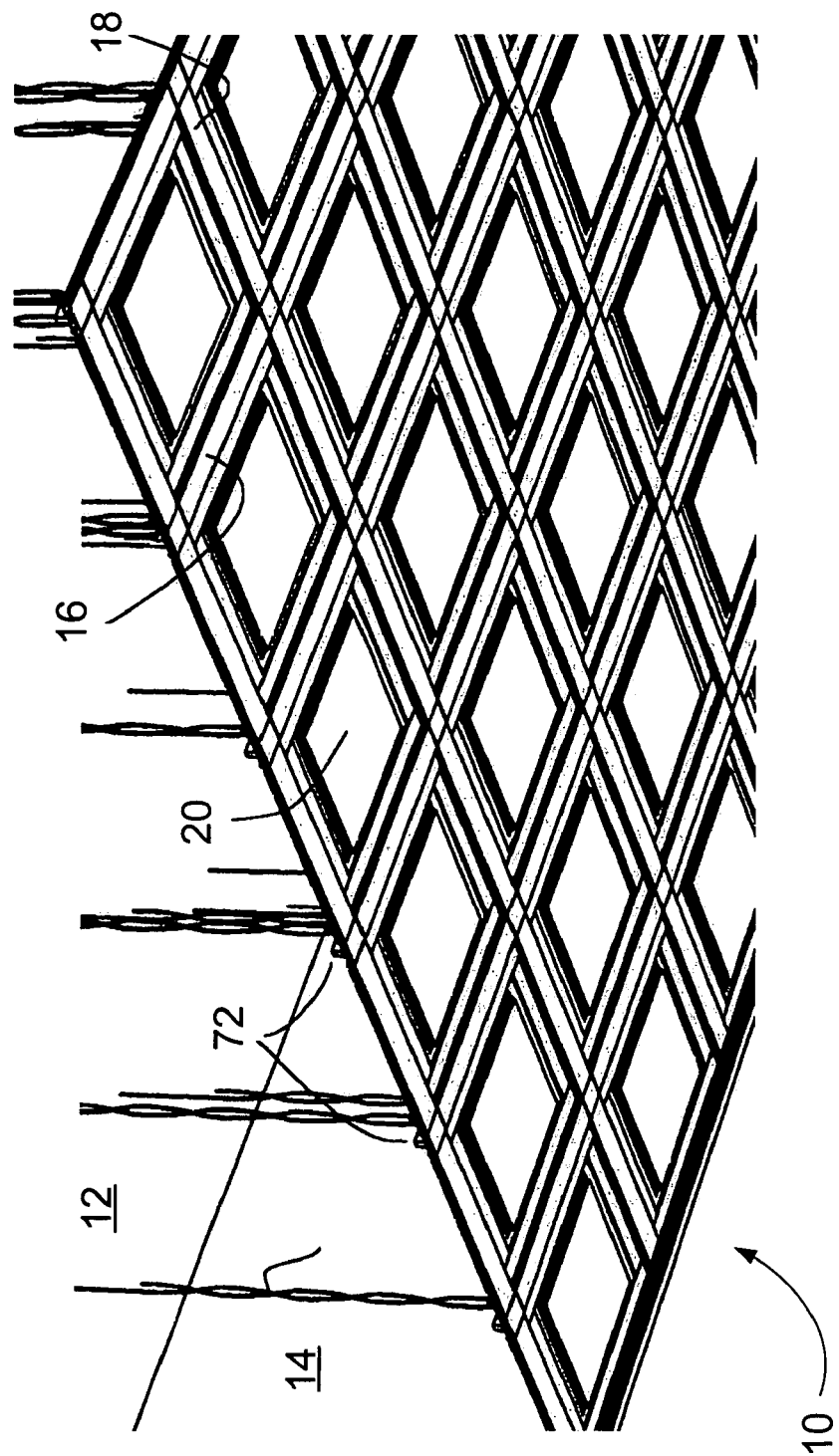
FIG. 1. is a bottom perspective view of a suspended ceiling in accordance with an embodiment of the invention.

Referring now to FIG. 1, it will be seen that a suspended ceiling 10 is mounted to a house ceiling structure 12 and the lateral side walls 14 of a room. The suspended ceiling 10 includes a plurality of longitudinally extending primary rails 16 (or main beams) and a plurality of transversally extending secondary rails 18 (or cross beams) extending between the primary rails 16 to form a grid pattern for receiving a plurality of ceiling panels 20. The suspended ceiling 10 is supported by vertical wall supports 22 mounted to the sidewalls 14 of the room (FIG. 3B) and vertically extending cables 24 anchored to the house ceiling structure 12. At the periphery of the grid pattern, the respective ends 26, 28 (FIGS. 3 and 4) of the primary and secondary rails 16, 18 are supported by the vertical wall supports 22 while the vertically extending cables 24 provide support to the grid pattern between the ends 26, 28, as it will be described more in details later. The vertical wall supports 22 are fastened, such as by nailing, to the lateral side walls 14, preferably, along the entire perimeter of the room.

Figure 2:
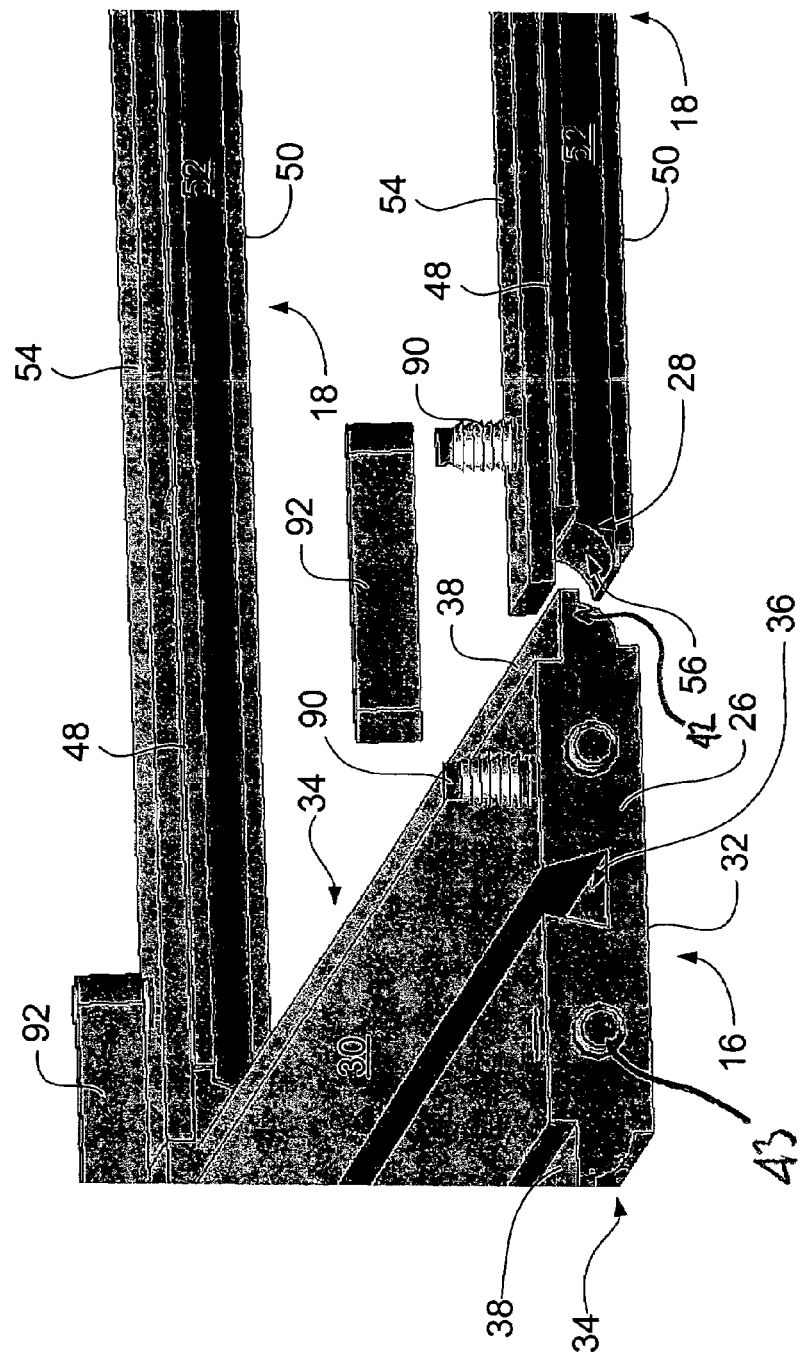
FIG. 2 is a perspective view of the suspended ceiling assembly in accordance with the embodiment of FIG. 1 showing a connection between a primary rail and a secondary rail.

Referring to FIG. 2, it will be seen that each primary rail 16 has two longitudinally opposed ends 26, an upper face 30, a lower face 32 (facing the interior of the room in which the suspended ceiling is installed), and opposing longitudinal sides 34. The upper face 30 has a central longitudinally extending slot 36 therealong and a pair of support ledges 38 along each sides 34. The slot 36 has a dovetail shape and acts as a guiding member or rail as it will be described more in details later. The sides 34 define, in combination with the ledges 38, a tongue 42. As shown in FIG. 2, a pair of pegs 43 extends axially from one end 26 of each primary rail 16 for mating engagement in a corresponding pair of holes or female portions (not shown) defined in the opposed adjoining end 26 of an adjacent primary rails, thereby allowing a plurality of primary rails to be assembled in an end-to-end relationship.

Each secondary rail 18 has two longitudinally opposed ends 28, an upper face 48, a lower face 50 (facing the interior of the room in which the suspended ceiling is installed), and opposing longitudinal sides 52. A ridge 54 projects upward from the upper face 48 of the secondary rails 18 and extends the length thereof, and projects axially outwardly from each end 28. The ends 28 of the secondary rails 18 are cut to form a groove 56 that matches the profile of the sides 34 of the primary rails 16 as it will be described more in details later.

Figure 3:
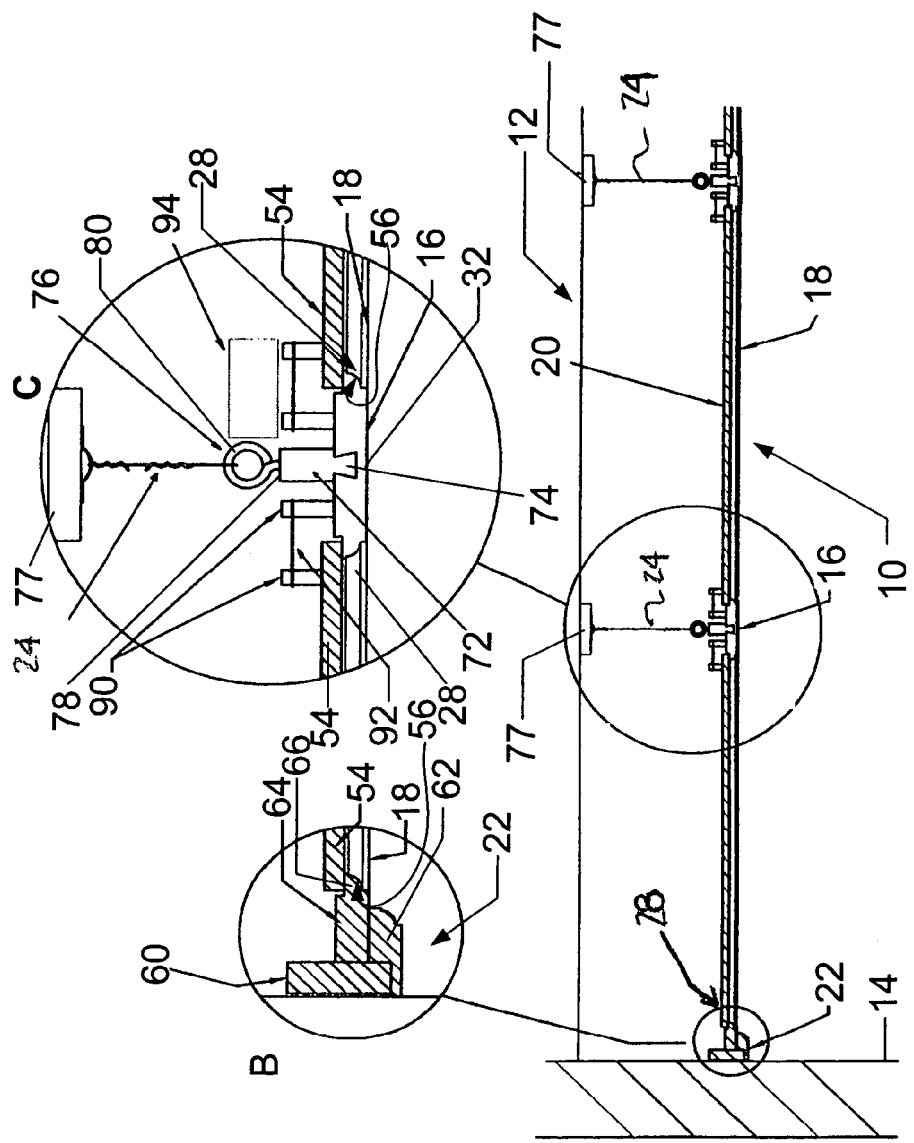
FIG. 3 is a cross-sectional view of a suspended ceiling assembly taken along one series of secondary rails in accordance with an embodiment of the invention and showing the secondary rails extending laterally from opposed sides of the primary rails.
Figure 4:
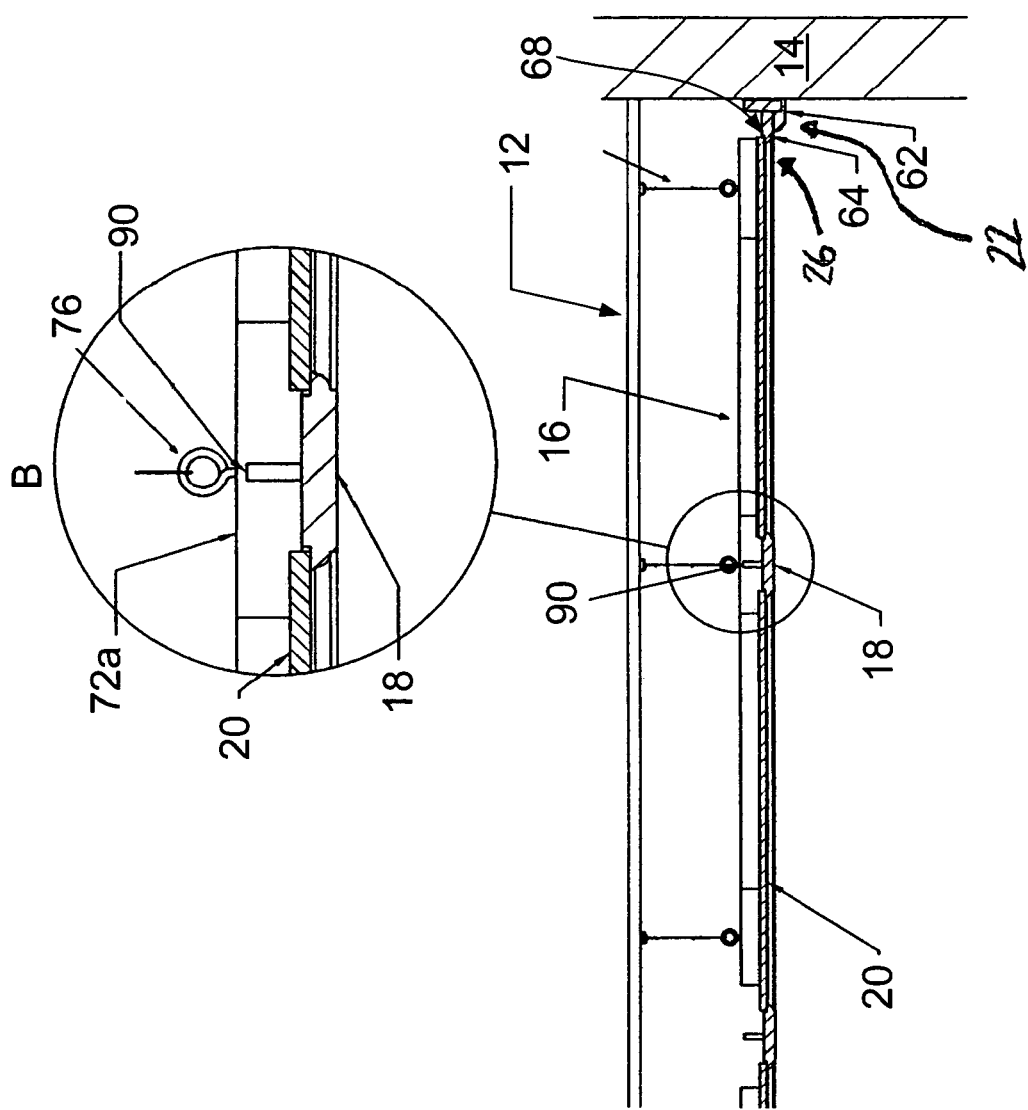
FIG. 4 is a cross-sectional view of the suspended ceiling assembly taken along one series of primary rails in accordance with the embodiment of FIGS. 2 and 3.

Referring to FIGS. 3 and 4, it will be seen that to form a grid pattern, the vertical wall supports 22 are mounted to the lateral side walls 14 of the room, along the entire perimeter (FIG. 3). The vertical wall supports 22 have an L-shape with a vertical section 60 and a horizontal section 62 (FIG. 3b). The vertical section 60 is mounted to a side wall 14 with a fastener, an adhesive or any other means known to one skilled in the art while the horizontal section 62 is adapted to support either a primary rail 16 or a secondary rail 18.

It can also include a molding member 64 parallel to the horizontal section 62 of the vertical wall support 22. The molding member 64 can be mounted, abutted to the vertical wall support 22 or the vertical wall support 22 and the molding member 64 can be single-piece. The molding member 64 is used to mount either a primary or a secondary rail 16, 18 on the wall 14. The molding member 64 has a tongue 66 to be inserted into a groove 68 (FIG. 4) at an end 26 of the primary rail 16 or into the groove 56 at an end 28 of the secondary rail 18.

Then, a plurality of primary rails 16 are mounted to the vertical wall supports 22, parallel to one another in one direction of the room. The distance between two adjacent primary rails 16 is adjusted according to the size of the ceiling panels 20.

The primary rails 1.6 include a rectangular insert 72 that is slidably inserted into the slot 36 of the primary rails 16 (FIG. 3c). The insert 72 has a dovetail shaped lower edge 74 which is shaped to slidably engage the dovetail shape slot 36 to support the primary rail 16. A plurality of eye screws 76 are inserted into the upper face 78 of the insert 72 and are spaced preferably uniformly along the length of the primary rail 16. The eye portion 80 of the eye screws 76 receives the cable 24 to suspend the primary rail 16. The opposite end of the cable 24 is mounted to the house ceiling structure 12. The combination of the insert 72 and the eye screw 76 defines an anchoring member for the grid pattern.

Figure 5:
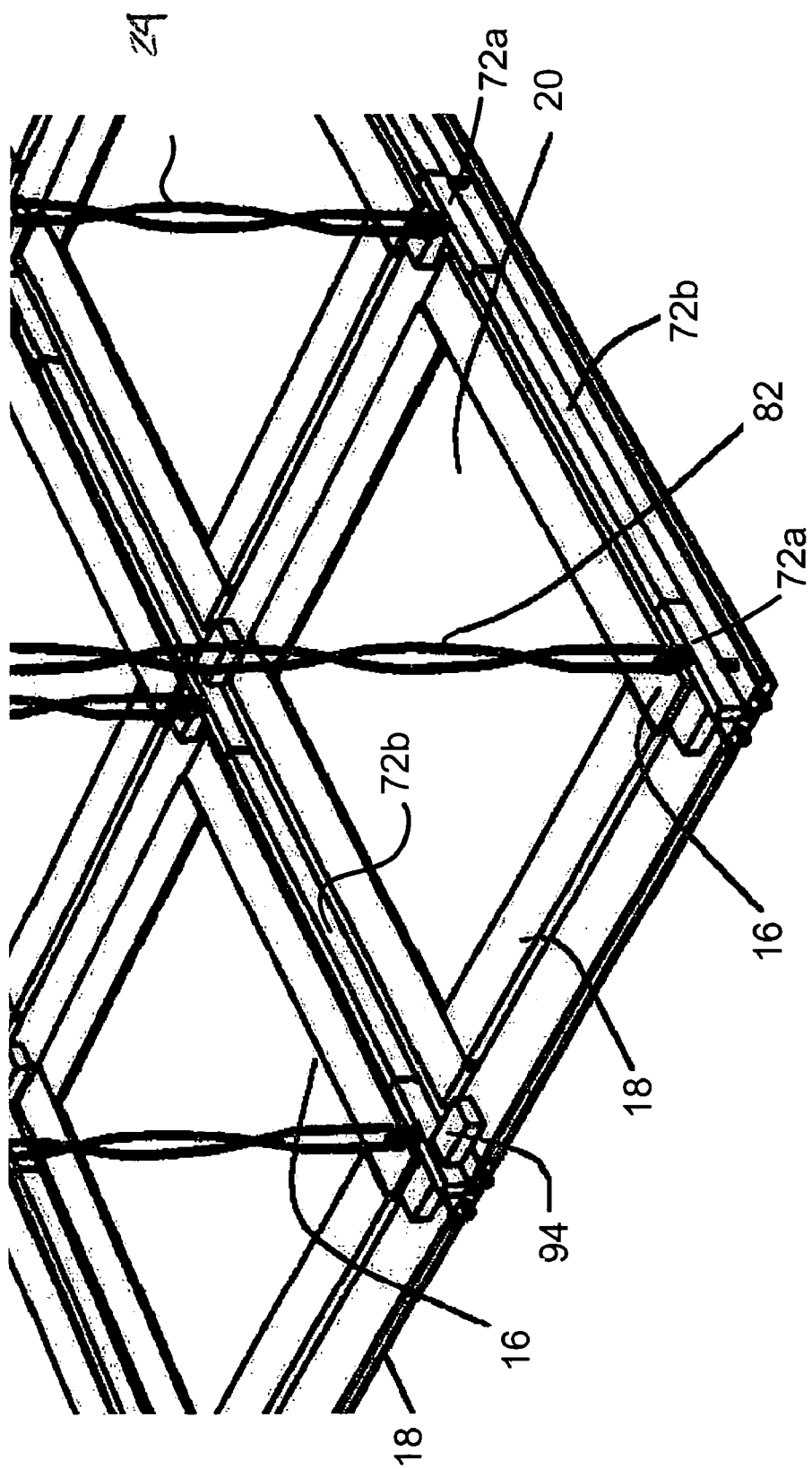
FIG. 5 is an upper perspective view of the suspended ceiling assembly in accordance with the embodiment of FIGS. 2 to 4.

Referring to FIG. 5, it will be seen that according to one embodiment of the present invention, the insert 72 is split into several sections having two models: a first model section 72a including an eye screw 76 adapted to connect the primary rail 16 to the ceiling 12 through the cable 24 and a second model section 72b filling the space into the slot 36 between two first model section 72a. The second model sections 72b prevent the first model sections 72a to slide into the slot 36 once mounted to the ceiling 12. Having an insert 72 split into multiple sections allows to match the position of the eye screw 76 with the position of a beam 77 (FIGS. 3 and 4) of the ceiling 12.

One skilled in the art will appreciate that the insert 72 can be single-piece all along a primary rail 16. The position of the eye screws 76 along the upper surface 78 of the insert 72 can be adjusted to match the position of the beams 77 of the ceiling 12.

The length of the cable 24 is adjusted in accordance with the height of the suspended ceiling 10.

Secondary rails 18 are mounted parallel to one another and transversally to the primary rails 16 but not necessarily perpendicular to the primary rails 16. As for the primary rails 16, the distance between two secondary rails 18 is adjusted in accordance with the size of the ceiling panels 20 to be mounted to the grid pattern.

The secondary rails 18 are mounted to the primary rails 16 and the vertical wall supports 22. Secondary rails 18 are mounted to the vertical wall supports 22 in a manner similar to the one described for the primary rails 16. Referring to FIG. 2, it will be seen that for mounting a secondary rail 18 to a primary rail 16, the tongue 42 of a primary rail 16 and the groove 56 of a secondary rail 18 are engaged with one another in a tongue and groove relationship (or male and female member relationship) to form the grid pattern. The outward projection of the ridge 54 from an end 28 abuts the ledge 38 to support the secondary rail 18. The ends 28 of the secondary rails 18 adjacent to a lateral side wall 14 are either abutted against the horizontal section 62 of the vertical wall supports 22 or the groove 56 of the secondary rail 18 is inserted into the tongue 66 of the molding member 64 in a tongue and groove relationship (or male and female member relationship).

To reinforce the connection between the primary and secondary rails 16, 18, dowels 90 are inserted into their respective upper faces 30, 48 (or ridge 54) proximate to the junction of the primary and secondary rails 16, 18. An extremity of each dowel 90 protrudes from the upper surface 30, 48 (or ridge 54). The dowel 90 of the primary rail 16 is connected to the dowel 90 of the secondary rail 18 with a resilient member 92 such as an elastic loop. The assembly of both dowels 90 and the resilient member 92 can be covered with a housing 94 (FIG. 3c) to solidify the assembly thus obtained. Dowels 90 can be threaded dowels, as shown on FIG. 2, to facilitate their insertion into the primary and secondary rails 16, 18. The assembly of the dowels 90 and the resilient member 92 defines a U-shaped member having parallel rigid legs and a resilient member connecting both legs.

The relative position of the primary and secondary rails 16, 18 can be easily modified as desired by the installer depending on the size of the ceiling panels 20. The secondary rails 16 can be mounted anywhere along the primary rails 18. Moreover, due to the slidable anchoring members, the primary rails 18 can be mounted to the ceiling 12 anywhere along its length.

The combination of the groove and tongue assembly with the dowel and resilient member assembly to constitute the grid pattern creates a suspended ceiling assembly that is easy to install with a minimum of tools. The suspended ceiling assembly thus obtained is precise, resistant, and has an increased dimensional stability.

The lower face and the longitudinal side walls of the primary and secondary rails 16, 18 form the exposed surface of the grid, which will be viewed once the ceiling panels 20 are in position, and have preferably an aesthetic wood appearance. The materials used for the rails 16, 18 and the ceiling panels 20 can vary but they are preferably wholly made from solid wood, fiberboard, laminated or not. The lower faces 32, 50 of the rails 16, 18 and the ceiling panels 20 can have moldings to provide a unique aesthetical appearance. They can also include engraved patterns.

Even if in the embodiment described hereinabove the slot 36 and the lower edge 74 have a dovetail shape, one skilled in the art will appreciate that they can have another shape and still mate in a male and female relationship. Moreover, the slot can be positioned in the insert 72 and the primary rails 16 can include a longitudinally extending protruding member adapted to matingly engage in a male-female relationship the slot of the insert 72. It can also consist of rail members (not shown) having mating sections respectively mounted to the lower surface of the insert 72 and the upper surface of the rails.

Similarly, the shape of the tongue 42 of the side walls 34 and the groove 56 of the end walls 28 of the secondary rails 18 can differ from the one of the above described embodiment. Furthermore, the groove can be positioned on the end walls 28 of the secondary rails 18 while the tongue can be positioned on the side walls 34 of the primary rails 16; the groove of the secondary rail 18 being adapted to matingly engage the tongue of the primary rails 16 in a male-female relationship.

The secondary rails 18 can also include either a longitudinally extending male or female member on the upper surface 48 or ridge 54 adapted to matingly engage an insert having a corresponding male or female member. The insert can be adapted to connect the secondary rails 18 to the ceiling 12 of the house. The ridge 52 and the upper surface 48 of the secondary rail 18 can be single piece.

One skilled in the art will also appreciate that the molding member 64 can have a groove rather than a tongue 66 and mate in a male-female relationship with a corresponding tongue at the end 26, 28 of the primary and secondary rails 26, 28.

The vertical wall supports 22 do not necessarily have molding members 64 to mount the primary and secondary rails 26, 28 to the walls 14. The ends 26, 28 of the primary and secondary rails 26, 28 can be simply abutted, fastened, or adhesively mounted to the horizontal section 62 of the vertical wall supports 22.

Different hooks, fasteners, and the like can be used rather than the eye screw 76 to connect the upper surface 78 of the insert 72 to the ceiling 12. For example, the insert can have a plurality of lateral openings (not shown) in which the cable 82 to support the rails 16 is inserted.

One skilled in the art will appreciate that the resilient member 92 can be replaced by a length adjustable member such as a tie-wrap.

The embodiments of the invention described above are intended to be exemplary only. The secondary rails 18 are not necessarily mounted perpendicularly to the primary rails 16. The angle between the primary and secondary rails 16, 18 depends on the shape of the ceiling panels 20 to be mounted to the grid pattern formed by the rails 16, 18. The scope of the invention is therefore intended to be limited solely by the scope of the appended claims.

The invention claimed is:

1. A support frame in combination with a dropped ceiling formed of a plurality of individual ceiling panels, said support frame comprising:

a plurality of elongated primary rails disposed substantially parallel to one another, each having an upper face adapted to be suspended to a ceiling and opposing sides having one of a male member and a female member, said upper face having at least one protruding member; and a plurality of elongated secondary rails disposed substantially parallel to one another, each one of said secondary rails including an upper face and opposing first and second ends, at least one of said opposed first and second ends having the other of one of the male member and the female member for matingly engaging the one of said opposing sides of said primary rails for supporting said secondary rails and forming a grid pattern, said upper face having at least one protruding member mounted proximate to one of said first and second ends engaging said primary rail and being in registry with said at least one of protruding member of said primary rail, said protruding members of said primary and secondary rails being connected with at least one connecting member, and wherein a housing covers an assembly of two protruding members connected by said connecting member.

2. A combination as claimed in claim 1, wherein said at least one connecting member includes a resilient member.

3. A combination as claimed in claim 1, wherein said protruding members include dowels inserted in the upper faces.

4. A combination as claimed in claim 1, wherein at least one of said upper faces of said primary and secondary rails comprises a guiding member and at least one anchoring member mounted to said guiding member and displaceable therealong, said at least one anchoring member being adapted to mount said rails to a ceiling.

5. A combination as claimed in claim 4, wherein said guiding member is a slot having a dovetail shape and said at least one anchoring member comprises an insert having a dovetail shape edge adapted to matingly engage said dovetail shape slot.

6. A suspended ceiling assembly, comprising:

a grid pattern having a plurality of main beams with two longitudinal sides and a plurality of cross beams having opposed ends and at least one of said opposed ends engaging a longitudinal side of said main beams for supporting said cross beams, said grid pattern having an inverted U-shaped member with two parallel legs drawn one towards the other by a resilient member, each one of said parallel legs being mounted to respective adjoining main and cross beams, wherein said resilient member is an endless elastic adapted to be placed over the two parallel legs; and a plurality of ceiling panels disposed over said grid pattern.

7. A suspended ceiling assembly as claimed in claim 6, wherein said parallel legs are dowels inserted in the upper faces.

8. A suspended ceiling assembly as claimed in claim 6, comprising a housing covering said inverted U-shaped member.

9. A suspended ceiling assembly as claimed in claim 6, wherein said opposed ends of said cross beams and the longitudinal sides of said main beams are engaged in a male and female member relationship.

10. A support frame for a suspended ceiling assembly, comprising:

a plurality of main beams each having an upper face adapted to be suspended to a ceiling and two longitudinal sides;

a plurality of cross beams having an upper face and opposing ends, at least one of said opposed ends being adapted to be engaged wit one of said longitudinal sides of said main beams for supporting said cross beams and forming a grid pattern with openings; and at least one U-shaped member having two parallel rigid legs and a variable length arm joining both parallel legs; each of said parallel rigid legs being independently rightly securable to respective main and cross beams for reinforcing the assembly of said main and cross beams, wherein a housing covers said U-shaped member.

11. A support frame as claimed in claim 10, wherein said variable length arm is a resilient arm.

12. A support frame as claimed in claim 10, wherein said parallel legs include dowels inserted in the upper faces.

13. A support frame as claimed in claim 10, wherein said opposed ends of said cross beams and said longitudinal sides of said main beams are engaged in a groove and tongue relationship.

* * * * *